April 7, 1942.　　　　P. ORR　　　　2,278,623
CENTRIFUGAL POSITIVE CLUTCH
Filed April 26, 1939　　　3 Sheets-Sheet 1
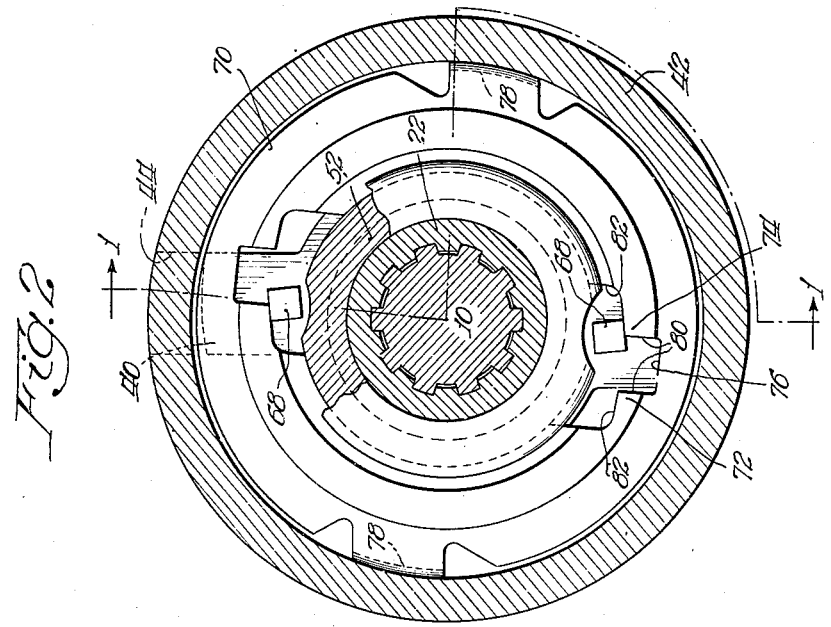
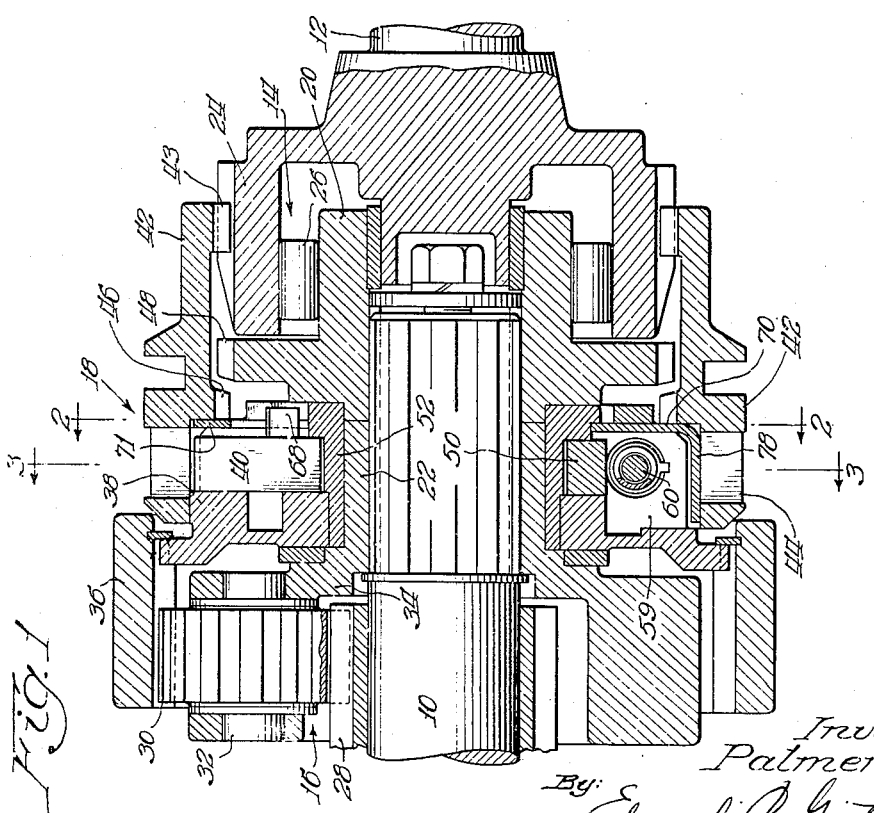
Inventor:
Palmer Orr
By: Edward P. Gritzbaugh
Atty

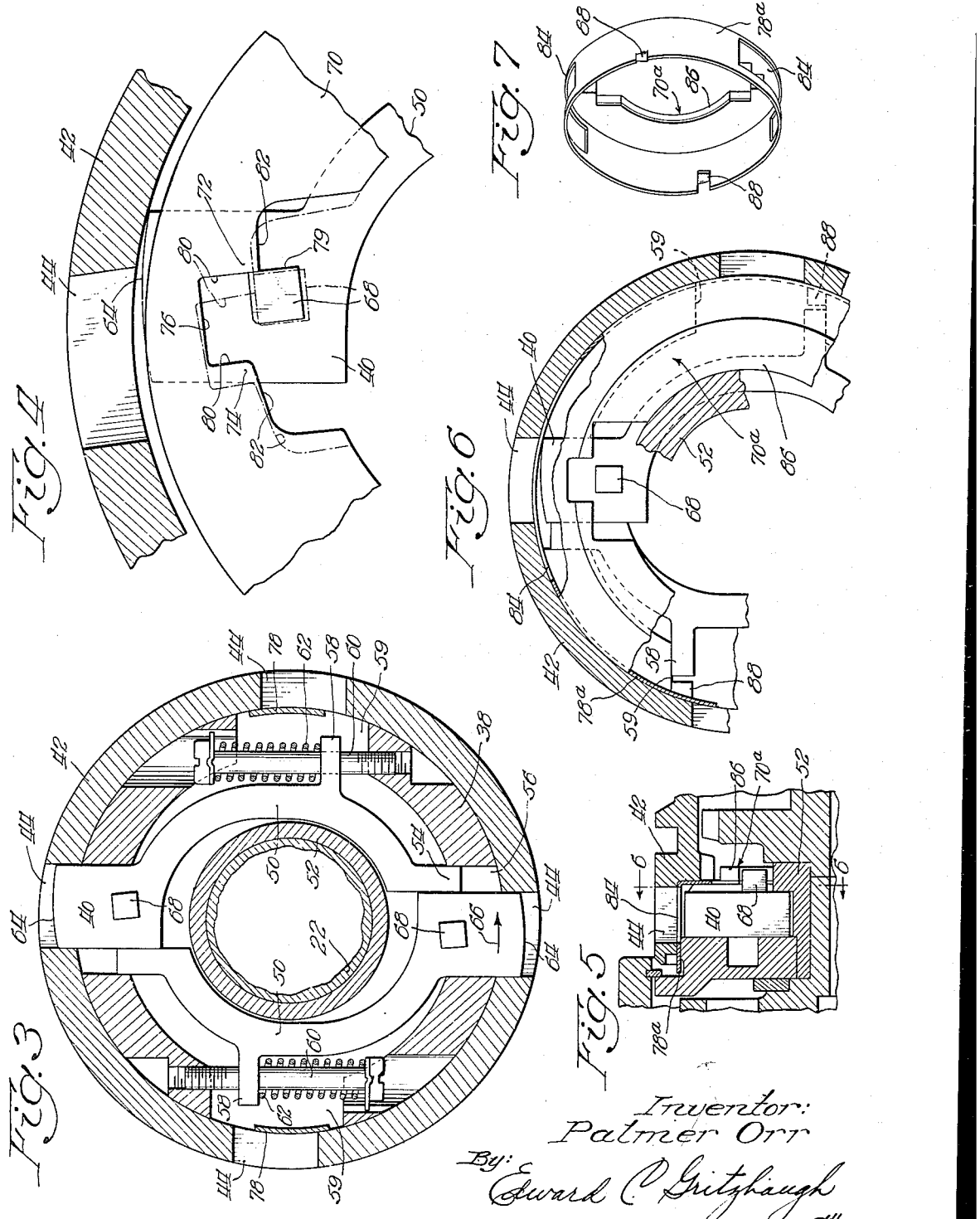

April 7, 1942. P. ORR 2,278,623
CENTRIFUGAL POSITIVE CLUTCH
Filed April 26, 1939 3 Sheets-Sheet 3
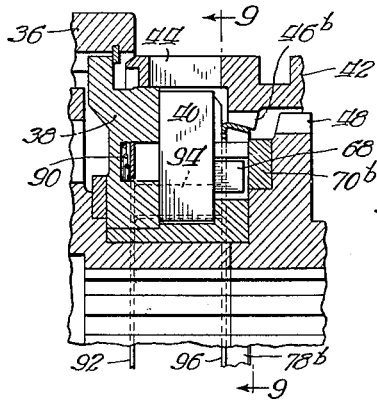
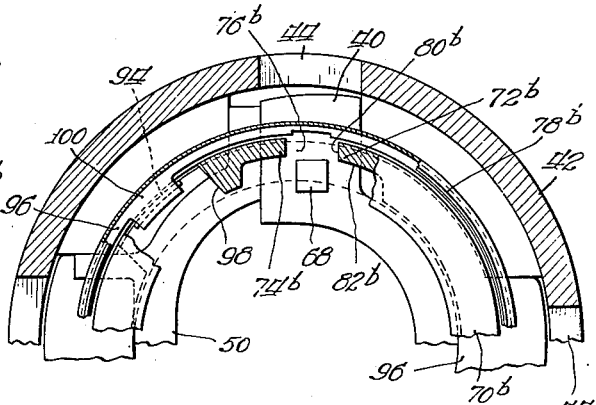
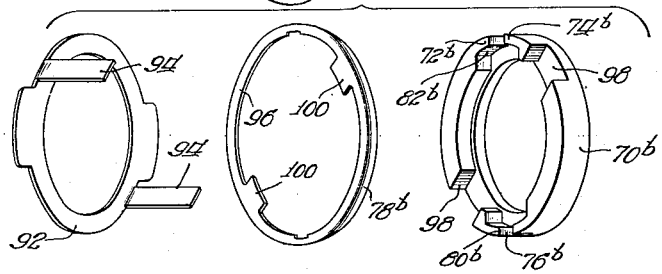
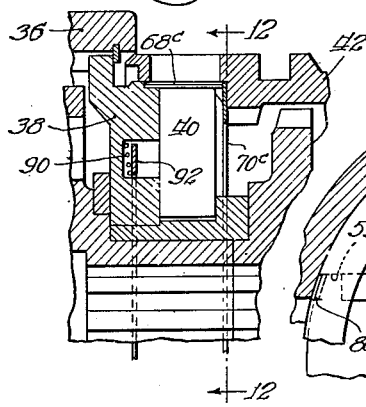
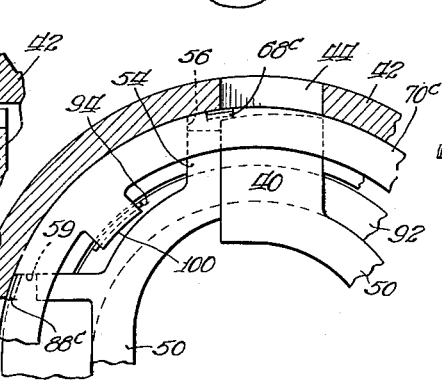
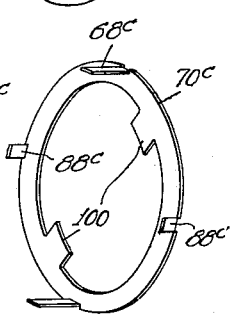
Inventor:
Palmer Orr
By Edward P. Gritzbaugh
Atty.

Patented Apr. 7, 1942

2,278,623

UNITED STATES PATENT OFFICE 2,278,623

CENTRIFUGAL POSITIVE CLUTCH

Palmer Orr, Muncie, Ind., assignor to Borg-Warner Corporation, Chicago, Ill., a corporation of Illinois Application April 26, 1939, Serial No. 270,071

16 Claims. (Cl. 192—105)

This application relates to centrifugal positive clutches of the type commonly known as "Keller" clutches. In a clutch of this type, a pair of coupling members, rotatably mounted on a common axis one within the other, are adapted to be coupled together at a predetermined rotational speed, by pawls radially slidable in the inner member and adapted to be projected by centrifugal force into suitable sockets or openings in the outer member.

In order to minimize shock resulting from the coupling operation, and to give the operator some control over this operation, clutches of this type have been designed with cammed faces on the outer ends of the pawls, enabling the pawls to ride over the openings in the outer coupling member as long as the driving member is rotating ahead of the driven member. The normal method of effecting coupling in such a clutch, is to momentarily decelerate the engine of the vehicle in which the clutch is installed, so as to slow down the driving member until it commences to be overrun by the driven member. Assuming that the pawl carrying member is rotating at a sufficiently high rate of speed, the pawls will then enter the openings in the outer member.

While a clutch of this type has been roughly satisfactory when operated in the manner described, it is not foolproof, and has been found to have characteristics of performance which may become quite objectionable, particularly under the control of an inexperienced driver.

One of the conditions under which the clutch may develop objectionable operating characteristics, is that in which the driver of a motor vehicle equipped with an overdrive embodying one of the clutches under consideration, accelerates the engine of the vehicle continuously after having passed the speed at which the clutch is able to shift the transmission into overdrive, and continues to maintain operation thereof in direct drive for a protracted period of time, without releasing the accelerator pedal pressure so as to allow the transmission to shift into overdrive. With such a condition existing, the pawls of the centrifugal clutch will continue to rattle against the edges of the openings in the outer member of the clutch, producing not only an objectionable noise, but developing rapid wear in the clutch. One object of the present invention is to provide a clutch of the type under consideration, in which the pawls are restrained from contacting the outer shell of the clutch as long as they are thus overrunning the shell in the forward direction.

Another condition under which objectionable characteristics may develop, is that in which the vehicle begins to free-wheel downhill while the engine is idling and the clutch pawls are in their retracted positions. Should the acceleration of the vehicle under coasting bring the driven member to a speed substantially above the cut-in speed of the clutch, while the engine is idling, and should the operator subsequently open the throttle so as to bring the engine speed up to a sufficiently high point to cause the pawls to be projected, the pawls will be engaged by the more rapidly rotating shell, with a jolt which becomes more severe in direct proportion to the rate at which the shell is overrunning the pawl carrying member. The present invention aims to provide a clutch adapted to avoid the occurrence of this condition, i. e., a clutch wherein the pawls are restrained from contacting the outer shell while the latter is overrunning the pawls in the forward direction.

The third condition under which objectionable operating characteristics may develop in such a clutch, is that wherein the vehicle is being driven backward at a speed higher than the cut-in speed of the clutch, a condition which is quite possible. While clutches in commercial use are provided with a device for rendering the clutch inoperative while the vehicle is in reverse gear, as soon as the transmission is shifted back to neutral, the clutch is again allowed to operate centrifugally, and should this happen immediately following a period of reverse operation in which the speed has exceeded the cut-in speed of the clutch, the engagement of the pawls will produce a jolt in the same manner as described above. The invention aims to correct this condition also.

Briefly, the invention contemplates, in a centrifugal positive clutch of the type mentioned, the provision in combination with such a clutch, of means for preventing the pawls from contacting the shell member of the clutch as long as the shell member and pawl carrying member are rotating at different speeds, such means becoming operative to allow the pawls to engage when the rotation of the two members is synchronized.

These and other objects and features of this invention will become apparent from the following description when taken together with the accompanying drawings, in which:

Fig. 1 is an axial sectional view of a portion of an overdrive transmission embodying the invention, taken as indicated by the line 1—1 of Fig. 2;

Fig. 2 is a transverse sectional view of the same taken as indicated by the line 2—2 of Fig. 1;

Fig. 3 is another transverse sectional view taken as indicated by the line 3—3 of Fig. 1;

Fig. 4 is an enlarged detail sectional view of the same, illustrating the blocking mechanism in several positions of operation;

Fig. 5 is an axial sectional view of a modification of the invention;

Fig. 6 is a transverse sectional view of the modification of Fig. 5, taken on the line 6—6 of Fig. 5;

Fig. 7 is a perspective view of the blocker drum of Fig. 5;

Fig. 8 is an axial sectional view of another modification of the invention;

Fig. 9 is a transverse sectional view thereof taken on the line 9—9 of Fig. 8;

Fig. 10 is an exploded perspective view of the form shown in Fig. 8;

Fig. 11 is an axial sectional view of a further modification of the invention;

Fig. 12 is a transverse sectional view of the form shown in Fig. 11, taken on the line 12—12 of Fig. 11; and Fig. 13 is a perspective view of the blocker ring of Fig. 11.

As an illustration of one form of mechanism in which the invention may be embodied, I have shown in Fig. 1 a portion of an overdrive transmission which may include a driving shaft 10, a driven shaft 12, an overrunning clutch 14 for normally establishing a drive from the drive shaft 10 to the driven shaft 12 in one-to-one ratio, and adapted to allow the driven shaft 12 to overrun the drive shaft 10, planetary overdrive gearing 16, and a centrifugal positive clutch 18 adapted to establish an overdrive from the drive shaft 10 through the planetary gearing 16 to the driven shaft 12.

The overrunning clutch 14 may include an inner clutch member 20 splined upon the end of the drive shaft 10, an outer shell member 24 formed integrally with the driven shaft 12, and rollers 26 interposed between the inner clutch member 20 and the shell member 24 and adapted to establish a binding drive connection between the two clutch members when the drive shaft 10 tends to overrun the driven shaft 12.

The planetary overdrive gearing 16 may include a sun gear 28, loosely encircling the shaft 10 and anchored to a fixed member, planetating pinions 30 journalled on studs 32 mounted in a flange 34 formed integrally with the sleeve 22, and a ring gear 36 mounted upon and drivingly connected to the pawl carrying inner member 38 of the centrifugal clutch 18. With the sun gear 28 fixed, the planet pinions 30, which mesh therewith, will receive rotation therefrom as they are swung around in their orbits by the planet carrier 34 under rotation of the latter by the drive shaft 10, and will transmit rotation to the ring gear 36 at a rate of speed greater than that of the drive shaft 10. The ring gear 36 in turn rotates the pawl carrier 38 in which the pawls 40 are mounted for radial sliding movement so as to be projected into engagement with the interior of the shell 42 of the centrifugal clutch whenever the speed of rotation of the pawl carrier 38 exceeds a predetermined point.

The shell 42 is provided with openings 44 into which the pawls 40 may be projected for establishing a drive from the ring gear 36 to the shell 42 and thence through a splined connection 43 of the latter with the shell member 24 of the overrunning clutch 14, to the driven shaft 12, thereby establishing an overdrive from the drive shaft 10 to the driven shaft 12.

The shell 42 of the centrifugal clutch is adapted to be shifted axially from the position shown in full lines wherein it is set for centrifugal operation, to a position wherein positive clutch teeth 46 on the interior of the shell are engaged with positive clutch teeth 48 formed on the driving sleeve 22, and wherein the openings 44 are out of register with the pawls 40, and the latter are restrained against outward projection by engagement with the imperforate region of the shell 42. In this position of the shell, the driven shaft is locked to the driving shaft for direct drive either in forward or reverse.

Referring now to Fig. 3, the pawls 40 include yoke portions 50 extending laterally around the hub 52 of the pawl carrier 38, and have tail-end portions 54, the tail-end portion of one pawl being slidably mounted in the opening 56 in which the other pawl is mounted. Each yoke portion 50 is provided with a projecting ear 58 through which extends a stud 60 threaded into the pawl carrier 38. The ears 58 are accommodated in recesses 59 in the pawl carrier. A coil spring 62, compressed between the head of the stud 60 and the ear 58, yieldingly maintains the pawl in a retracted position until the speed of rotation of the pawl carrier has reached a sufficiently high point to overcome the resistance of the spring.

The outer ends of the pawls 40 are cammed as at 64 so that, when the pawl carrier is rotating (in the direction indicated by the arrow 66) ahead of the shell 42, the pawls may rotate past the openings 44 in the shell without entering said openings, even though their speed of rotation has passed the cut-in point. With this condition existing, deceleration of the pawl carrier until the shell member 42 commences to rotate ahead of it, will result in the pawls entering the openings 44, and from that point on a two-way drive will be established through the clutch, as long as the speed of rotation remains above the cut-in point.

The present invention provides means for restraining the pawls 40 from contacting the inner surface of the shell member 42 as long as relative rotation exists between the pawl carrier and the shell in either direction. Such means comprises a stud 68 mounted in each of the pawls, and a blocking ring 70 having pairs of opposed blocker steps 72, 74 adapted to oscillate into positions blocking the path of radial projection of the lugs 68, except when the ring 70 is centered with respect to the lugs 68, at which time the lugs 68 may enter recesses 76 in the blocker ring 70, defined between the steps 72 and 74, and thereby allow the pawls 40 to be projected to their clutching positions.

On the periphery of the blocking ring 70 are a pair of friction shoes 78 which are adapted to engage frictionally against the interior surface of the shell 42 so as to tend to rotate therewith. Such frictional engagement may be established through the medium of an oil film capable of transferring a slight amount of drive between the shoes 78 and the shell 42 and yet minimizing wear between the friction surfaces.

The blocker ring 70 is accommodated between the rear end of the pawl carrier 38 and a shoulder 71 formed in the shell 42 just ahead of the teeth 46. The friction shoes 78 are accommodated in an annular space defined between the pawl carrier 38 and an interior surface of the shell 42. Thus the invention may be incorporated in a conventional overdrive mechanism with practically no change in such mechanism.

As a result of the friction drive association between the blocker ring and the shell 42, whenever the pawl carrier is rotating ahead of the shell, the blocker ring will be oscillated, relative to the pawl carrier, to a position wherein the lugs 68 are blocked by the blocker steps 74 as shown in Fig. 2, and whenever the shell 42 is rotating ahead of the pawl carrier 38, the blocker ring 70 will be rotated relative to the pawl carrier to a position wherein the lugs 68 are blocked by the steps 72.

Assuming now, that the pawl carrier is rotating ahead of the shell and the parts are in the relative positions shown in Fig. 2, this condition will exist at all times when the drive shaft is driving the driven shaft in one-to-one ratio through the overrunning clutch 14. Assuming further that the speed of rotation is accelerated until the cut-in point of the clutch is reached, the pawls 40 will react to centrifugal force and attempt to fly out into engagement with the internal surface of the shell 42. Before contacting such surface however, the lugs 68 will become engaged against the circumferential edges 82 of the blocker steps 74, and the pawls will thereby be held in positions wherein their outer ends are spaced from the inner surface of the shell 42 as indicated in dotted lines in Fig. 2.

The speed may be increased to any possible point, and the pawls will remain restrained in this position as long as the relative directions of rotation of the pawl carrier and shell are not reversed. Assuming now that the operator releases the accelerator pedal and allows the engine to decelerate, thus decreasing the speed of the pawl carrier until such speed is finally equal to that of the shell 42 and begins to decrease below it, a slight amount of lag on the pawl carrier behind the shell 42 will cause the blocker ring 70 to oscillate, relative to the pawl carrier 38, so as to bring the lugs 68 into registry with the recesses 76. As soon as the lugs 68 have become freed from the radial restraining engagement of the steps 74, the pawls will shift radially outwardly the short distance separating the ends of the pawls and the inner surface of the shell 42, bringing the ends of the pawls into contact with the inner surface of the shell. Continued oscillation of the blocker ring relative to the pawls, will bring the radial edges 80 of the opposite steps 72 into engagement with the lateral faces 79 of the lugs 68, as shown in Fig. 4.

It may be noted at this point that the pawls 68 are square in cross section, and the corners of the steps 72, 74, are not rounded off to any appreciable degree, so that when the parts have reached the intermediate stage shown in full lines in Fig. 4, there will be overlapping regions of the radial faces 79 and 80, respectively, of the lugs 68 and steps 72, so as to restrain further oscillating movement on the blocker ring 70 relative to the pawls during the interval while the openings 44 are rotating around to positions of registry with the pawls 40 so as to allow the latter to complete their projecting movement. In the absence of this overlap arrangement, as for example if the corners of the lug 68 and steps 72, 74, were sufficiently rounded off to produce a camming effect between the lug and the corners of the steps, it would be possible for the blocker ring to force its way on past the position of registry of the notches 76 with the lugs 68, and thereby re-lock the pawls in their retracted positions and prevent coupling of the clutch. The provision of a definite amount of radial spacing between the position of the lug 68, indicated in dotted lines in Fig. 4, when blocked against the circumferential face 82 of the step, and the position assumed by the lugs when the pawls are in contact with the shell 42, produces this overlap.

As soon as the openings 44 have moved into registry with the pawls 40, the pawls will continue their outward projection, entering the openings 44 and thereby establishing a driving connection between the pawl carrier 38 and the shell 42. Since the pawl carrier and shell were in substantial synchronism before the pawls 40 were allowed to move into engagement with the interior surface of the shell, the pawls will remain in engagement with such interior surface only during a portion of one revolution such as may be necessary to move the pawls, relatively to the shell, from the positions wherein they first contacted the shell to positions of registry with the openings 44. Thus, wear is practically completely eliminated, and there is no jumping of the pawls across the openings 44 whatsoever.

The invention makes it possible to eliminate the cam faces 64 on the ends of the pawls 40, if desired, since the function of these cam faces, in carrying the pawls across the openings 44, is eliminated.

The friction shoes 78 are preferably of spring material, and the inner surface of the shell 42, contacted by the shoes 78, is preferably a ground surface.

In the modified form of the invention shown in Figs. 5, 6 and 7, the blocker ring 70a may be provided, instead of the shoes 78, with a peripheral flange 78a which is continuous except for the openings 84 which accommodate the pawls 40. The ring 78a may be provided with a hub member 86 which may be journalled upon the sleeve 52. Oscillating movement of the blocker ring relative to the shell 42 may be limited by lugs 88 struck inwardly from the flange 78a, receivable in the openings 59 in the pawl carrier 38, and engageable with the circumferential extremities thereof.

The form of the invention shown in Fig. 5 is adapted to be used in overdrives wherein there is sufficient clearance between the adjacent peripheral faces of the pawl carrier and shell 42, to accommodate the thickness of the flange 78a. In other cases, it is desirable to employ the friction shoe type of construction previously described.

Instead of engaging against the inner surface of the shell 42, the friction flange 78b of the form of invention shown in Figs. 8, 9 and 10 is adapted to engage against the end faces of the jaw clutch teeth 46b. These faces may be cut at an angle so as to collectively form a frusto-conical friction surface, and the flange 78b may be formed frusto-conically to match. Friction between the friction faces may be developed by a conical spiral spring 90 compressed between the pawl carrier 38 and a thrust ring 92 having a pair of diametrically opposed fingers 94 engaged against lugs 100 on the ring 96 on which the flange 78b is formed.

The blocker ring 70b in this form of the invention is formed separate from the friction flange 78b, of thicker material, and has the steps 72b, 74b, in the form of axial projections on one of its sides. The steps 72b and 74b, the notches 76b formed therebetween, and the faces 80b, 82b, correspond to the parts similarly numbered in Fig. 4 and coact with the lugs 68 of the pawls 40 in the same manner.

The lost motion connection between the blocker ring and the pawl carrier is, in this form of the invention, established by the engagement of the fingers 94 with the circumferential extremities of notches 98 in the blocker ring 70b, into which notches the fingers 94 project. The notches 98 also function to establish a driving connection between the blocker ring 70b and the friction ring 96, through the medium of the lugs 100, which project radially inwardly into the notches 98. It may be noted at this point, that the blocker ring 70b and friction ring 96 occupy positions in the same general plane, the friction ring encircling the blocker ring, both being disposed between the plane of the rear side of the pawls 40 and the plane of the forward side of the positive clutch member 48.

By employing the frusto-conical friction surface arrangement shown in Fig. 8, together with spring means for urging the friction faces into engagement, adequate frictional engagement is assured throughout the life of the mechanism, irrespective of wear occurring on the friction faces.

In the form of the invention shown in Figs. 11, 12 and 13, the blocking instead of being performed between step regions of the blocker ring and lugs projecting laterally from the pawls, is accomplished by blocker fingers 68c, which are adapted to extend into the radially outward extremities of the recesses 56 in the pawl carrier 38, and to move from positions, indicated in Fig. 12, blocking the path of radial projection of corner regions of the pawls 40, to positions registering with the tail-end 54 of the opposite pawls, and therefore out of the path of projection of the pawls 40. The lost motion connection between the blocker ring 70c and the pawl carrier may be formed either by the engagement of the fingers 68c with the circumferential extremities of the recesses 56, or by stop members 88c engageable in the recesses 59 of the pawl carrier, in the manner previously set forth with respect to the lugs 88 of Fig. 7.

The ring 70c is piloted in the shiftable sleeve 42 by the fitting of its periphery within the cylindrical inner surface of the sleeve 42. Frictional driving engagement between the ring 70c and the sleeve 42 is established by a spring 90 and a thrust ring 92 such as the ring 92 shown in Fig. 10, having fingers 94 engaging lugs 100 on the ring 70c and pressing the latter against the shoulder 71 of the sleeve 42.

I claim:

1. In a centrifugal positive clutch, a pair of axially aligned rotatable coupling members, a speed responsive pawl carried by one of said members and adapted, above a predetermined speed of rotation thereof, to be projected into coupling engagement with the other member, and said pawl having a laterally projecting lug, a blocking ring mounted for limited rotary movement relative to said pawl carrying member, said ring having a radially stepped recess including a shallow region wherein said lug will be radially confined so as to block said pawl from advancing to coupling position, when said ring is in one position of such rotary movement, and a deeper region adapted to accommodate said lug so as to allow said pawl to advance to coupling position, when said ring is in another position of such rotary movement, and means energized by differential rotation of said members, for urging said blocking ring to blocking position.

2. In a centrifugal clutch, in combination with a rotatable shell having a pawl receiving opening, a rotatable pawl carrier within said shell, and a centrifugal force responsive pawl carried by said carrier, and adapted, above a predetermined speed of rotation thereof, to be projected into said opening so as to establish a direct drive coupling between said carrier and shell, a blocking ring mounted adjacent said carrier for limited oscillating movement relative thereto, said blocking ring having at its periphery a friction element extending axially, engaging an interior surface of said shell and adapted, when said carrier and sleeve are rotating differentially, to bias said blocking ring to a position obstructing radial advance of said pawl.

3. A centrifugal positive clutch as defined in claim 2, wherein said blocking ring is of relatively thin material and received between axially opposed regions of said shell and carrier.

4. In a centrifugal clutch, in combination with a rotatable shell having a pawl receiving opening, a rotatable pawl carrier within said shell, and a centrifugal force responsive pawl carried by said carrier, and adapted, above a predetermined speed of rotation thereof, to be projected into said opening so as to establish a direct drive coupling between said carrier and shell, a blocking ring mounted adjacent said carrier for limited oscillating movement relative thereto, said ring having at its periphery an axially extending element in frictional engagement with an interior surface of said shell, said ring adapted to have limited oscillating movement relative to said carrier, from a position wherein said axially extending element blocks radial projection of said pawl to a position wherein said axially extending element allows said pawl to advance to coupling engagement with said shell, said blocking position being induced by differential rotation of said shell and carrier, and the latter mentioned position being induced by synchronization of said shell and carrier.

5. In a centrifugal positive clutch, a pair of axially aligned rotatable coupling members, a speed responsive pawl carried by one of said members and adapted above a predetermined speed of rotation thereof, to be projected into coupling engagement with the other member, said pawl having an axially projecting portion, and a blocking ring mounted for oscillating movement on the axis of the clutch, said blocking ring having a portion disposed in a radial plane, arranged to coact with said projecting portion so as to limit such oscillating movement and so as to block radial projection of the pawl when in one of its positions thus limited, and being arranged to be moved to blocking position by differential rotation of said members.

6. In a centrifugal positive clutch, a pair of axially aligned rotatable coupling members, a pawl carried by one of said members and adapted to be centrifugally projected into coupling engagement with the other member, said pawl having an axially projecting lug, and a blocking member mounted for limited circumferential movement relative to said pawl carrying member, having a part adapted in one position of such movement to coact with said lug for blocking projection of the pawl, and in another position of such movement to allow the pawl to advance to coupling position, said blocking member having a portion disposed in a radial plane, arranged to be moved to blocking position by differential rotation of said members.

7. In a centrifugal positive clutch, a pair of axially aligned rotatable coupling members, a centrifugal force responsive pawl mounted in one of said members and adapted above a predetermined speed of rotation thereof to be projected into coupling engagement with the other member, and a blocking member mounted for a circumferential movement and adapted in one position of such movement to block projection of said pawl to coupling position, said blocking member having an axially extending element in frictional engagement with a radially inner surface of said other member and adapted when differential rotation of said members exists to move said blocking member to blocking position.

8. In a centrifugal clutch, a pair of axially aligned rotatable coupling members, a speed responsive pawl carried by one of said members and adapted above a predetermined speed of rotation thereof, to be projected into coupling engagement with the other member, a blocking member mounted for limited circumferential movement relative to said one member and adapted under axial pressure to establish a frictional drive connection with said other member whereby to be biased, when differential rotation exists between said members, in a position wherein it is adapted to block projection of said pawl to its coupling position, and resilient means urging said blocking member into frictional drive engagement with said other member.

9. A centrifugal clutch as defined in claim 2, wherein said friction element is in the form of a shoe of limited circumferential extent.

10. A centrifugal clutch as defined in claim 2, wherein said friction element is relatively thin radially and is accommodated in an annular space defined between the periphery of said carrier and said interior shell surface.

11. In a centrifugal positive clutch, in combination with a rotatable shell having a pawl receiving opening, a rotatable pawl carrier within said shell, and a centrifugal force responsive pawl carried by said carrier and adapted, above a predetermined speed of rotation thereof, to be projected into said opening so as to establish a direct drive coupling between said carrier and shell, said pawl having an axially projecting lug, a blocking ring mounted for limited rotary movement relative to said pawl carrying member, said ring having a radially stepped recess including a shallow region wherein said lug will be radially confined so as to block said pawl from advancing to coupling position when said ring is in one position of such rotary movement, and a deeper region adapted to accommodate said lug so as to allow said pawl to advance to coupling position when said ring is in another position of such rotary movement, said blocking ring having at its periphery a friction element extending axially, engaging an interior surface of said shell and adapted, when said carrier and sleeve are rotating differentially, to bias said blocking ring to a position obstructing radial advance of said pawl.

12. In a centrifugal clutch, in combination with a rotatable shell having a pawl-receiving opening, a rotatable pawl carrier within said shell, and a centrifugal force-responsive pawl carried by said carrier, and adapted, above a predetermined speed of rotation thereof to be projected into said opening so as to establish a direct drive coupling between said carrier and shell, a blocking ring mounted adjacent said carrier for limited oscillating movement relative thereto, said blocking ring being adapted when in one position of said movement to block, and in another position to allow movement of said pawl to said coupling position, and means, energized by differential rotation of said shell and carrier, for biasing said ring in its blocking position, said means comprising a friction clutch element having a conical face engaging a cooperating conical friction face on the shell, and means yieldingly engaged between said friction clutch element and an axially opposed region of the carrier, for urging said friction clutch element into frictional engagement with said cooperating friction face.

13. In a centrifugal clutch in combination with a rotatab'e shell including a peripheral region having a pawl-receiving opening and an inwardly projecting shoulder, a rotatable pawl carrier within the space defined by said peripheral region and said shoulder, a centrifugal force-responsive pawl carried by said carrier and adapted, above a predetermined speed of rotation, to be projected into said opening so as to establish a direct drive coupling between said carrier and shell, a blocking ring mounted between said carrier and said shoulder for limited oscillating movement relative to said carrier, said blocking ring having a portion in frictional engagement with said shell and having a portion adapted as the result of torque received by said ring from the shell through said frictional engagement when said carrier and sleeve are rotating differentially, to be biased to a position of said oscillating movement wherein it obstructs radial advance of said pawl.

14. A centrifugal clutch as defined in claim 13, wherein said blocking ring has a blocking part interposed, in blocking position between the end of the pawl and the other member.

15. A centrifugal clutch as defined in claim 13, wherein said blocking ring has a blocking finger bent axially from the periphery thereof and interposed, when in blocking position, between the end of the pawl and the other member.

16. A centrifugal clutch as defined in claim 13, wherein there are two of the pawls and each is formed on one end of an element the other end of which comprises a tail portion positioned adjacent the pawl of the other element, the blocking ring having a blocking part adapted to move from a position accommodated between the tail portion of one element and said pawl, to a position between the pawl of the other element and said shell, thereby blocking projection of said pawl.

PALMER ORR.